United States Patent [19]

Bonham, Jr.

[11] Patent Number: 5,305,607
[45] Date of Patent: Apr. 26, 1994

[54] GEOTHERMAL POWER PLANT SCALE SEPARATION METHOD AND APPARATUS

[75] Inventor: Enos A. Bonham, Jr., Houston, Tex.

[73] Assignee: Magma Power Company, San Diego, Calif.

[21] Appl. No.: 945,381

[22] Filed: Sep. 16, 1992

[51] Int. Cl.$^5$ .................... F01K 27/00; F03G 7/00
[52] U.S. Cl. .................... 60/641.5; 60/646; 60/657; 210/747; 210/170
[58] Field of Search .............. 60/641.2, 641.3, 641.5, 60/646, 657; 210/747, 170

[56] References Cited

U.S. PATENT DOCUMENTS

| | | | |
|---|---|---|---|
| 3,974,039 | 8/1976 | Frohner et al. | 210/714 X |
| 4,302,328 | 11/1981 | Van Note | 210/714 |
| 4,304,666 | 12/1981 | Van Note | 210/197 |
| 4,761,188 | 8/1988 | Miyata | 148/6.2 |
| 4,776,961 | 10/1988 | Gritters et al. | 210/714 X |
| 4,849,101 | 7/1989 | Desjardins | 210/170 |
| 5,116,516 | 5/1992 | Smisson | 210/170 X |
| 5,147,535 | 9/1992 | Bernhardt | 210/170 X |

Primary Examiner—Edward K. Look
Assistant Examiner—Hoang Nguyen
Attorney, Agent, or Firm—Harness, Dickey & Pierce

[57] ABSTRACT

In a geothermal electrical power generating plant of the type employing one or more flash crystallizers and one or more reactor clarifiers for processing a large quantity of particulate silica that precipitates out of the hot geothermal brine as thermal energy is extracted during power production, method and apparatus for continuously separating toxic particulate scale out of the non-toxic particulate silica. A portion of the clarifier sludge underflow is treated to cause vertical separation of the scale particles from the silica particles by means of a continuous vertical countercurrent decantation process in which a liquid slurry of the silica and scale particles is flowed upwardly at a velocity greater than the terminal settling velocity of the silica and less than the terminal settling velocity of the scale. Such separation minimizes toxic waste disposal problems, and enables the large amount of particulate silica waste to be disposed of as ordinary landfill, or as an ingredient of concrete or for other purposes.

27 Claims, 2 Drawing Sheets

GEOTHERMAL POWER PLANT SCALE SEPARATION METHOD AND APPARATUS

BACKGROUND OF THE INVENTION

1. Field of the Invention

The present invention is in the field of electrical power production from steam flashed from high temperature geothermal brines which have a high content of dissolved silica, and also a content of hazardous classified constitutents.

2. Description of the Prior Art

Some high temperature geothermal brine resources are known which contain very large amounts of geothermal energy, but which until recent years had not been usable for the commercial production of electrical power because of a high dissolved silica content. Thus, in the Imperial Valley of California, the Salton Sea Known Geothermal Resources Area (KGRA), otherwise known as the Salton Sea Geothermal Anomaly, is estimated to have approximately 3,400 $MW_e$ of geothermal energy available for the generating of electrical power, which is believed to be self-regenerating by percolating waters. The KGRA geothermal resource is estimated to be a greater energy reserve even than the oil reserves on the North Slope of Alaska. A similar geothermal resource is the Brawley geothermal field which is also in the Imperial Valley of California. Development of these large geothermal reources was almost completely blocked until recent years by the high dissolved silica content, which precipitated out on walls of vessels and piping in power production plants to the extent of up to about 42 inches thickness per year of scaling. This problem was resolved by Magma Power Company, now of La Jolla, San Diego County, Calif., by flashing the geothermal brine to steam for generating electrical power in a series of first high pressure and then low pressure flash crystallizers in which the dissolved silica was precipitated out on a vast silica seed particle area rather than on surfaces of flash vessels and asociated piping and valves. The use of flash crystallizers for this purpose was first taught in the Featherstone U.S. Pat. No. 4,429,535, while retrieval in reactor clarifiers of the silica seed particles useful for the purpose was taught in the VanNote U.S. Pat. Nos. 4,302,328 and 4,304,666.

In geothermal electrical power plants embodying the flash crystallizer/reactor clarifier technology for preferentially precipitating out the silica on silica seed particles suspended in the geothermal brine flowing through the plant in flash crystallizers, and then retrieving the preciptated particulate silica in reactor clarifiers, there is a huge output quantity of precipitated silica sludge that is removed from the reactor clarifiers and then thickened and pressed into filter cake for disposal and-/or use as a filler material in concrete or for other purposes. A serious problem with this now conventional procedure is that there is still some precipitation which grows on walls of vessels and pipes in the plant which tends to break loose in particulate form and join the silica particles in the geothermal brine flowing through the plant, and thus become intermingled with the particulate silica in the silica sludge retrieved from the reactor clarifiers, so as to become a part of the silica sludge filter cake that must be disposed of. The problem here is that such intermingled scale particles contain a number of substances classified as hazardous materials, including but not limited to arsenic, lead, copper, zinc and silver. Prior to the present invention, this conventional silica retrieval procedure has prevented or seriously restricted the disposal of the silica filter cake as simple landfill in sanitary refuse disposal areas, thus making the disposal undesirably complicated and expensive; and it also has made the use of this filter cake plant byproduct in concrete or for other purposes undesirable or possibly even unlawful.

SUMMARY OF THE INVENTION

In view of these and other problems in the art, it is a general object of the present invention to provide, in a geothermal electric power generating plant of the type employing flash crystallizers and reactor clarifiers for processing the large quantity of silica that precipitates out of the geothermal brine as thermal energy is extracted during power production, method and apparatus for continuously separating the nontoxic particulate silica from toxic particulate scale, so that the silica and scale can be separately disposed of.

Another object of the invention is to provide, in a geothermal power plant, method and apparatus of the character described for separating particulate silica and particulate scale which does not materially reduce overall plant efficiency.

Another object of the invention is to provide, in a geothermal power plant, method and apparatus of the character described which sufficiently reduces the proportion of hazardous classified constituents in the particulate silica filter cake byproduct of the plant so as to make the filter cake acceptable for simple sanitary refuse landfill disposal.

Another object of the invention is to provide, in a geothermal power plant, method and apparatus of the character described for separating out hazardous classified constituents from byproduct silica, so as to minimize the difficulty and expense of hazardous waste disposal.

Another object of the invention is to provide, in a geothermal power plant, method and apparatus of the character described for separating particulate silica byproduct and particulate scale which utilizes a substantial particle size differential, and may also utilize a density differential, between the silica particles and the scale particles to effect the separation by employing a generally vertically upwardly directed liquid flow stream with a flow velocity substantially greater than the terminal settling velocity of the silica particles, but substantially less than the terminal settling velocity of the scale particles.

A further object of the invention is to provide, in a geothermal power plant, method and apparatus of the character described for treating the reactor clarifier sludge underflow for separation of particulate toxic scale from particulate nontoxic silica in the underflow, which embodies a dilution procedure for continuously diluting the sludge underflow during the separation process so as to reverse a generally thixotropic nature of the sludge, enabling free generally vertical countercurrent separation movement of the silica and scale particles in the generally vertical liquid flow separation mode of operation of the invention.

According to the invention, in a geothermal power generating plant of the type employing flash crystallizers and reactor clarifiers for processing a large quantity of silica that precipitates out of the geothermal brine during power production, silica sludge underflow from the reactor clarifiers which has been separated out from the main brine injection flow stream in the reactor clarifiers is treated in scale separator apparatus having a generally vertically oriented elongated cylindrical decanter which extends upwardly from an inclined collector vessel to separate out a minor fraction of hazardous classififed particulate scale constituents from the predominately particulate silica solids content of the clarifier underflow. The clarifier underflow is fed directly into the decanter portion of the apparatus, as is a flow of dilution liquid from the plant, and a liquid outlet from the scale separator apparatus extends from the top of the decanter, so that a combined flow of the inlet sludge and dilution liquid circulates continuously upwardly through the decanter and out its top, containing substantially all of the clarifier underflow particulate silica from which the scale has been separated in the decanter, and this silica particle-laden outflow from the top of the decanter is returned to the reactor clarifier(s) for reprocessing.

The combined clarifier underflow and dilution liquid inputs to the decanter are adjusted to produce a continuous liquid upflow through the decanter which is substantially greater than the terminal settling velocity of the silica particles, yet substantially less than the terminal settling velocity of the scale particles, thereby effecting the silica/scale particle separation in the decanter, with the scale particles flowing upwardly and out the top of the decanter for clarifier reprocessing, and the scale particles settling downwardly through the decanter and into the collector vessel and down to the lower end of the collector vessel for either periodic or continuous blowdown or dumping. This separation process utilizes the fact that the silica particles are much smaller in size than the scale particles (the silica particles averaging about 8-12 microns, and the scale particles averaging about 50 microns or larger in diameter), and the physical characteristic of such particles that, in general, the larger a particle is, the larger the ratio between its mass (weight) and its surface area, giving the larger particles a greater terminal settling velocity than the smaller particles. Thus, gravity dominates vertical movement of the larger scale particles, while upward liquid circulation dominates movement of the smaller silica particles.

The relative proportions of silica sludge and dilution liquids fed to the decanter are adjusted for sufficient dilution of the underflow sludge to assure reversal of the thixotropic nature of the sludge and a sufficiently low viscosity of the liquid in the scale separator for free separation of the silica and scale particles in the decanter, as well as free circulation of any silica particles in the collector vessel for return upwardly through the decanter. Preferably, the dilution is adjusted so that the slurry within the decanter contains no more than about 20 percent suspended solids to effect these purposes. The dilution liquid is preferably primarily from the main brine stream clarifier injection outflow; but may also be obtained from an atmospheric flash tank located upstream of the reactor clarifiers or from plant condensor fresh water output, or from a combination of these.

The scale separator collector vessel is inclined above the horizontal an angle that is greater than the angle of repose of the scale particles, so that the scale particles all slide downwardly to the lower end of the collector vessel for blowdown, which may be either automatically or manually controlled. A satisfactory collector vessel angle relative to the horizontal is on the order of about 40°–45°.

Preferably, on the order of about 18-20 percent of the clarifier underflow is sent to the scale separator apparatus, which continuously provides a sufficient amount of silica/scale sludge to the separator apparatus for efficient silica/scale separation, while at the same time not materially reducing overall plant processing efficiency.

BRIEF DESCRIPTION OF THE DRAWINGS

These and other objects and advantages of the invention will become more apparent in view of the following description and the accompanying drawings, wherein.

DETAILED DESCRIPTION

Figure 1A:
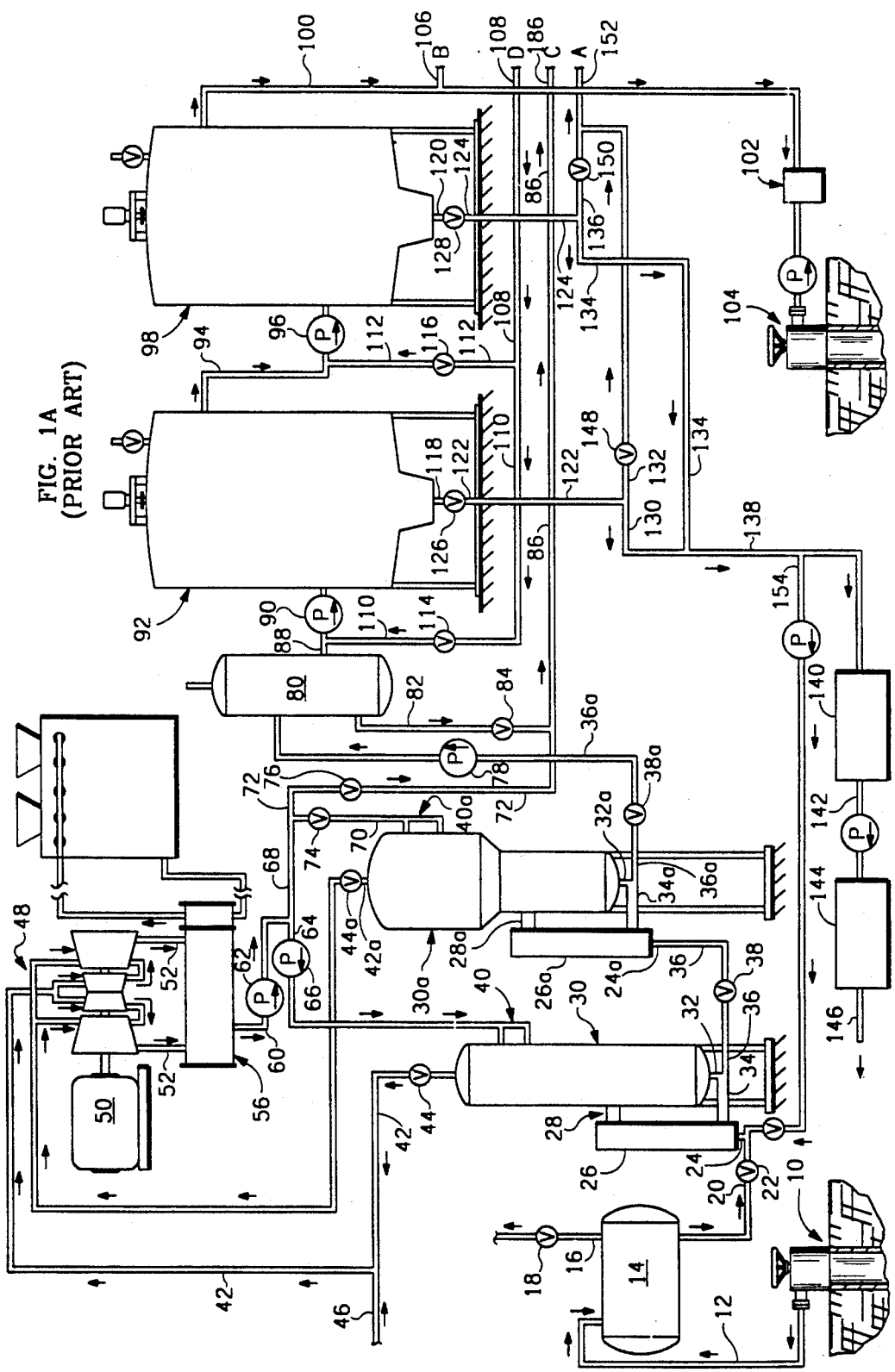
FIG. 1A is a diagrammatic view illustrating a geothermal electrical power generating plant embodying the present invention.
Figure 1B:
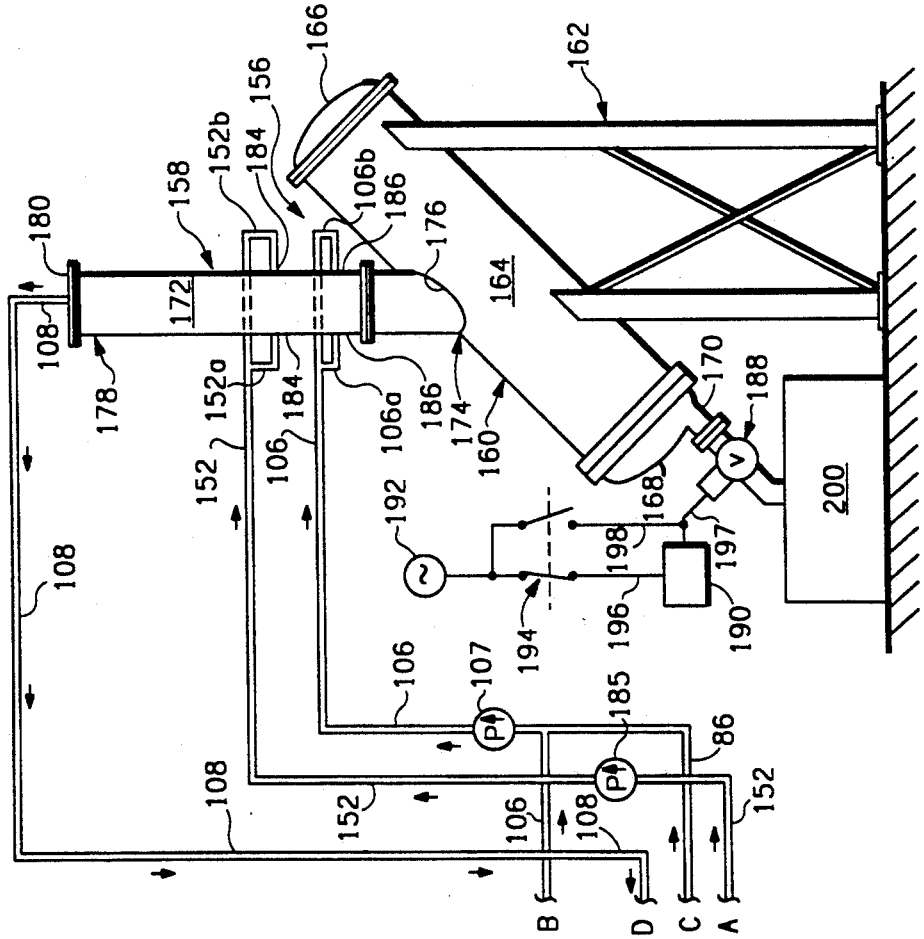
FIG. 1B is a diagrammatic view illustrating a presently preferred embodiment of the scale separator system of the invention, and its conduit connections to the plant shown in FIG. 1A.

Referring to the drawings, FIG. 1A diagrammatically illustrates a geothermal electric power generating plant similar to the geothermal power plant shown and described in applicant's U.S. Pat. No. 4,930,316, issued Jun. 5, 1990. The layout of the new subject matter of the present invention is illustrated in FIG. 1B, and its cooperation with the basic plant layed out in FIG. 1A is effected through a series of connecting flow conduits identified as A, B, C and D at the right-hand edge of FIG. 1A and the left-hand edge of FIG. 1B.

In the geothermal power plant shown and described in said U.S. Pat. No. 4,930,316 high temperature geothermal brine from one or more production wells is first applied to one or more vapor separators which separate some high temperature, high pressure steam from the brine, while at the same time separating most of the noncondensable gases from the brine. Such separated steam and noncondensable gases are processed to substantially eliminate the noncondensable gases, while at the same time recovering most of the heat energy from the steam necessarily separated from the brine with the noncondensable gases, and at the same time recovering heat energy from the noncondensable gases themselves. In the system of said U.S. Pat. No. 4,930,316, the remaining hot geothermal brine after such separation is then passed to one or more high pressure flash cryztallizers in which high pressure, high temperature steam is separated from the hot brine, the brine then flowing at reduced temperature to one or more respective low pressure flash crystallizers in which the remaining usable steam is separated. The steam separated in the flash crystallizers, together with steam produced from heat recovered during the noncondensable gas separation process, is directed to high and low pressure stages of one or more steam turbines which drive one or more electric power generators. The spent brine from the low pressure flash crystallizer(s) passes to one or more reactor clarifiers which remove a large quantity of particulate precipitated silica. The spent brine from the reactor clarifier(s) is then pumped back into the acquifer through one or more injection wells.

A large quantity of dissolved silica is precipitated out of the brine with the extraction of heat energy from the brine in the high and low pressure flash crystallizers, the silica being preferentially precipitated as amorphous silica onto silica seed sludge particles derived from the reactor clarifier(s), thereby avoiding precipitation of the silica as glaze onto the walls of the flash crystallizer tanks and associated pipes and valves. The large mass of particulate silica from the flash crystallizers is flowed with the brine into the reactor clarifier(s) where further silica precipitation occurs, and the entire mass of silica sludge is collected in and removed from the reactor clarifier so that it will not clog the injection well or wells.

Applicant's said U.S. Pat. No. 4,930,316 is hereby incorporated by reference because of its detailed disclosure of the basic geothermal power plant illustrated in FIG. 1A. The Featherstone U.S. Pat. No. 4,429,535 is also hereby incorporated by reference for its basic method and apparatus dislcoures of the sequence of flash crystallizers and reactor clarifier(s).

In the basic geothermal power plant disclosed in applicant's said U.S. Pat. No. 4,930,316, the large quantity of precipitated silica sludge that is removed from the reactor clarifier(s) is thickened and pressed into a filter cake for disposal and/or use as a filler material in concrete or for other purposes, such use in the formulation of concrete being disclosed in the Whitescarver U.S. Pat. No. 4,761,182. However, a serious problem associated with either the disposal of such silica sludge filter cake or its use in concrete is that it contains a substantial component of scale which has grown on the walls of vessels and pipes of the plant system and then broken loose. Such scale contains a number of substances classified as hazardous materials, including but not limited to arsenic, lead, copper, zinc and silver. This prevents or seriously restricts the disposal of the filter cake as simple landfill in a sanitary refuse disposal area, making the disposal much more complicated and expensive. It also makes its use in concrete or for other purposes undesirable or even unlawful.

According to the present invention, physical distinctions between the precipitated silica seed and the scale are utilized to separate the scale from the silica seeds, so that the silica seeds and scale can be disposed of separately. The quantity of scale is relatively very small compared to the quantity of precipitated silica seeds, so that disposal of the separated scale as hazardous waste is a practical thing. The separation frees up the silica seed sludge so that its filter cake may be utilized as simple land fill, or as a component of concrete or for any other purpose. The physical differences between the silica seed particles and the scale particles are basically two things. The silica particles average between about 8 and 12 microns in diameter, while the scale particles average about 50 microns or larger in diameter. The other principal difference is that the scale particles are predominately composed of heavy metals so that the scale particles are, in general, more dense than the silica particles. The method and apparatus of the present invention focuses principally on the size difference for the separation, but the density difference is also a favorable contributing characteristic.

In addition to the amorphous silica particles, there is a very small quantity of other nonhazardous particles of similar small dimension which are separated out with the silica particles in the present invention, and are disposable with the silica particles. These include some iron silicates and borium sulfate crystals. Because of their similar size and relatively insignificant proportion, these will simply be included in the definition of silica particles for purposes of this description and the appended claims.

Referring again to FIG. 1A, one or more geothermal production wells generally designated 10 provide underground access to hot geothermal brine of the type to which the present invention is applicable, namely, hot geothermal brine which is particularly attractive as a source of heat energy for the production of electrical power because of its high temperature. The hot geothermal brine is selected to have a sufficiently high underground source temperature to enable the brine to be flowed up through the well(s) under the power of its own flashing steam, yet with the brine temperature still remaining sufficiently high at the wellhead for efficient operation of one or more electrical power generating turbines directly from steam separated from the geothermal brine. For this purpose, it is preferred that the source or bottom hole temperature of the geothermal brine be at least approximately 450° F., and the wellhead temperature be at least approximately 350° F. An example of a geothermal resource to which the present invention is particularly applicable is the Salton Sea geothermal field, sometimes referred to as the Salton Sea Geothermal Anomaly, located proximate the Niland region of the Imperial Valley in California. Another example of a geothermal resource to which the present invention applies is the Brawley geothermal field, also in the Imperial Valley. By way of example only, and not of limitation, an example well in the Salton Sea geothermal field drilled and owned my Magma Power Commpany based in La Jolla, San Diego County, Calif., has a bottom hole temperature of approximately 550° F. at a pressure of approximately 1250 psia (pounds per square inch absolute), with a total flow of approximately 3 million pounds per hour. Included in this flow are approximately 2,233,800 pounds per hour of water in both liquid and steam phases, approximately 757,500 pounds per hour of dissolved solids, and approximately 8,700 pounds per hour of carbon dioxide and other noncondensable gases.

Components of the dissolved solids content of the hot geothermal brine include the three primary chloride salts, sodium chloride, calcium chloride and potassium chloride, a large dissolved silica content, and metallic sulfides, and include the various hazardous constituents referred to above. A large amount of the silica content precipitates out on the silica seed particles provided from the reactor clarifier(s) as heat is extracted from the brine by the flashing of steam in the flash crystallizers, and some of the metallic sulfides and other hazardous materials referred to above precipitate with evaporation of superheated steam from the brine in the flash crystallizers. It is a primary purpose of the method and apparatus of the present invention to separate the hazardous particulate constituents from the silica seed particles in the hot geothermal brine which flows through the plant for increased efficiency, economy and utility in the disposal of the silica sludge filter cake, and at the same time synergistically to minimize the difficulty and expense of hazardous waste disposal.

The Overall Geothermal Power Plant Shown in FIG. 1A

Referring again to FIG. 1A of the drawings, the hot geothermal production well 10, which will be assumed by way of example to have the foregoing physical characteristics, delivers the hot brine and associated flashed steam through a supply conduit 12 to a high pressure separator 14, which is preferably a horizontal separator. Although only a single production well 10, supply conduit 12, separator 14, high and low pressure flash crystallizers, and tandem pair of reactor clarifiers are illustrated in FIG. 1A, it is to be understood that any number of such components in parallel may be employed in a geothermal electric power production plant according to the invention. The flashing of steam in production well 10 not only provides the motive power for driving the hot brine up through the production well, but also provides the power for driving the brine through separator 14 and the high and low pressure flash crystallizers. High pressure separator 14 has a gas outlet conduit 16 therein which conducts separated steam and noncondensable gases through a suitable control valve 18 to a noncondensable gas removal and heat recovery system like that shown and described in detail in applicant's aforesaid U.S. Pat. No. 4,930,316.

High pressure separator 14 has a hot brine outlet conduit 20 which leads to the sequence of flash crystallizers. Thus, outlet brine conduit 20 leads through an inlet valve 22 to an injector pipe 24 in the lower end portion of a vertical high pressure external draft tube 26. Inlet valve 22 controls the brine level in high pressure separator 14 by automatic control means (not shown) which operates from liquid level sensor means (not shown) in separator 14. Injector pipe 24 extends vertically upwardly through the bottom of external draft tube 26. Preliminary flashing of the incoming hot brine in draft tube 26 produces a two-phase flow of hot brine and steam out of the top of draft tube 26 and through an input nozzle generally designated 28 into high pressure flash crystallizer 30.

A brine exit conduit 32 extends downwardly from the bottom of flash crystallizer 30, and divides horizontally into a pair of oppositely directly conduits, a draft tube return conduit 34, and an output conduit 36 which has a control valve 38 therein. Draft tube return conduit 34 communicates with the lower end portion of draft tube 26 below the top of the incoming injector pipe 24.

External draft tube 26, flash crystallizer input nozzle 28, the lower portion of flash crystallizer 30, brine exit conduit 32, and draft tube return conduit 34 constitute a recirculation loop for the hot geothermal brine in which the brine flows upwardly through draft tube 26, transversely through input nozzle 28, downwardly through the lower portion of flash crystallizer 30 and its exit conduit 32, and then transversely through return conduit 34 back into draft tube 26. Flow of the hot brine through this recirculation loop is powered by translating thermal energy into circulation energy in draft tube 26 by a thermosiphon action. Such recirculation of the hot brine allows time for substantially all of the silica which comes out of the brine due to its cooling in flash crystallizer 30 to precipitate onto silca seed particles. Preferably, the brine recirculates in this circuit at least approximately six times to allow sufficient time for the relatively slow silica precipitation reaction to occur.

The steam which has flashed in draft tube 26 and primarily within flash crystallizer 30 flows upwardly in flash crystallizer 30 through a demister (not shown) that is served by a high pressure wash water spray system 40, and then out of the top of flash crystallizer 30 through a high pressure steam output conduit 42 which has a control valve 44 therein. The high pressure steam output conduit 42 is joined by another high pressure steam conduit 46 which is provided with high pressure steam from the noncondensable gas removal and heat recovery system (not shown) like that shown and described in applicant's aforesaid U.S. Pat. No. 4,930,316. The high pressure steam is then conducted through steam output conduit 42 to high pressure stages of a multiple stage steam turbine generally designated 48 which drives an electric power generator 50. The exhaust of steam turbine 48 passes through exhaust conduits 52 to a condensor system including a main condensor 54 which is preferably a surface-type condensor having in its bottom a condensate-receiving hotwell 56. Condensor 54 is served by conventional cooling means such as a cooling tower 58.

The condensed steam in condensor hotwell 56 is pure water known in the art as "sweet condensate" which is substantially completely devoid of dissolved salts and noncondensables from the brine, and is particularly suitable for use as wash water for the demisters in the flash crystallizers. This fresh water may also be used as a slurry dilution ingredient in the scale separator of the present invention, as described in detail hereinafter. Accordingly, a portion of this sweet condensate passes from hotwell 56 through a fresh water conduit 60 having a pump 62 therein, then to a high pressure wash water branch conduit 64 having a booster pump 66 therein, and then to the high pressure wash water spray system 40 in high pressure crystallizer 30. A second fresh water branch conduit 68 from conduit 60 divides into a low pressure wash water conduit 70 and a scale separator fresh water dilution conduit 72, the conduits 70 and 72 having respective control valves 74 and 76 therein for controlling this division of fresh water from branch conduit 68.

The fraction of the brine that does not recirculate back through external draft tube 26 flows out of high pressure flash crystallizer 30 through brine output conduit 36 and its control valve 38 to injector pipe 24a which injects this brine into the lower portion of vertical low pressure external draft tube 26a associated with the low pressure flash crystallizer. Control valve 38 controls the brine level in high pressure flash crystallizer 30 by automatic control means (not shown) which operates from liquid level sensor means (not shown) in high pressure flash crystallizer 30. Preliminary flashing occurs in external draft tube 26a, and a two-phase flow of brine and steam flows upwardly through external draft tube 26a through input nozzle 28a into low pressure flash crystallizer 30a. The brine exits low pressure flash crystallizer 30a through exit conduit 32a at the bottom of flash crystallizer 30a, and part of this brine recirculates to draft tube 26a through return conduit 34a, while a fraction of this brine leaves the recirculation circuit through output conduit 36a having control valve 38a therein. As with high pressure flash crystallizer 30, the brine surface level is automatically controlled by adjustment of control valve 38a pursuant to liquid level sensor means (not shown). Brine recirculation between low pressure flash crystallizer 30a and its associated draft tube 26a operates in the same manner as described in detail above for high pressure flash crystallizer 30 and its draft tube 26 to provide sufficient time for the silica precipitation reaction to occur.

The flashed steam flows upwardly in low pressure flash crystallizer 30a through a demister (not shown) which is provided with low pressure wash water through spray system 40a, and thence through low pressure steam output conduit 42a having control valve 44a therein. Steam output conduit 42a provides low pressure steam to low pressure stages of steam turbine 48. Low pressure wash water is provided to the wash water spray system 40a through wash water conduit 70 previously described.

The multiple flash stages provided by the two flash crystallizers 30 and 30a, and the associated multiple-stage turbine 48, are thermodynamically more efficient in the generation of electrical power than a single-stage system would be. An alternative arrangement within the scope of the invention which is also thermodynamically efficient is to utilize the high pressure steam from flash crystallizer 30 to directly drive high pressure steam turbine means as shown, but to transfer heat from the low pressure steam derived from flash crystallizer 30a in heat exchanger means to a power or working fluid in a binary power system. Although the multiple flash crystallizer stages are preferred, it is to be understood that a single flash crystallizer stage may be employed within the scope of the invention.

Each of the flash crystallizers 30 and 30a is provided with sufficient liquid brine capacity relative to the sizes of its respective input and outlet conduits, as adjusted by the respective output valves 38 and 38a, to enable achievement of a recirculation-to-feed rate of at least approximately 6:1. This gives the liquid brine a residency time within each of the flash crystallizers 30 and 30a that is sufficient for the supersaturated condition of the silica solution to be brought down to a level that is approximately at saturation by precipitation of the silica on the seed particles. Recycling of a small percentage of the silica sludge separated at the tail end of the plant into high pressure flash crystallizer 30 to provide seed particles of silica cumulatively presenting large surface areas of silica suspended within the brine onto which precipitating silica will preferentially amorphously form causes most of the silica which precipitates out in high pressure flash crystallizer 30 to do so in suspended, particulate form so as to flow with the brine both in the recirculation path and downstream, so that very little, if any, silica scale will form on the walls of flash crystallizer 30 and its recirculation path.

Because of reduced solubility of silica in the lower temperature range of low pressure flash crystallizer 30a, much more silica will precipitate out of the geothermal brine in flash crystallizer 30a than in flash crystallizer 30. However, the seed particles which flow downstream from high pressure flash crystallizer 30 into low pressure flash crystallizer 30a operate in the same manner as in high pressure flash crystallizer 30 to seed the large amount of precipitating silica onto the silica sludge particles which had already grown considerably from precipitation in high pressure flash crystallizer 30, so that most of the large quantity of silica that precipitates out in low pressure flash crystallizer 30a will, like that in high pressure flash crystallizer 30, be in suspended, particulate form that will flow with the brine stream.

The spent brine from which all of the useful steam has been flashed exits low pressure flash crystallizer 30a through its outlet conduit 36a and its control valve 38a, and is pumped by by a pump 78 into an atmospheric flash tank 80 in preparation for introduction into the tandem sequence of reactor clarifiers. A brine dilution conduit 82 exits from the lower portion of atmospheric flash tank 80 as an optional source of dilution liquid for the scale separator, this dilution brine passing through a valve 84 into a dilution liquid conduit 86 which passes out of the right-hand side of FIG. 1A at C. Fresh water dilution conduit 72 leading from hotwell 56 joins dilution liquid conduit 86. Valves 76 and 84 in the respective conduits 72 and 82 enable any desired mixture of fresh water and brine to be provided to dilution liquid conduit 86, enabling all fresh water or all brine to be provided to dilution liquid conduit 86, or enabling both the fresh water and brine sources to be cut off from dilution liquid conduit 86.

A brine output conduit 88 having a pump 90 therein provides the main spent brine flow stream to the input of a first reactor clarifier generally designated 92. Reactor clarifier 92 has an outlet conduit 94 with a pump 96 therein to provide the main brine flow stream to a second reactor clarifier generally designated 98, so that reactor clarifiers 92 and 98 are arranged in tandem.

The primary stream of clarified, spent brine is conducted from the second reactor clarifier 98 through an outlet conduit 100 to pass through a dual media filter 102 which removes any substantial amount of particulate material that may have escaped through reactor clarifier 98 prior to passage of the primary brine stream back into the underground aquifer through an injection well generally designated 104.

The primary source of dilution liquid for the scale separator is injection brine from the second reactor clarifier outlet conduit 100, and is provided through a conduit 106 which branches off from conduit 100, leaving the right-hand side of FIG. 1A at B, and which has a pump 107 therein (shown in FIG. 1B).

Silica seed sludge from which the scale has been removed in the scale separator of FIG. 1B is returned to the reactor clarifier system of FIG. 1A through a return conduit 108 which enters FIG. 1A from the right-hand side at D. Return conduit 108 divides into two separate return conduits 110 and 112 having respective control valves 114 and 116 therein, return conduit 110 providing return silica seed slurry to brine stream inlet conduit 88 for reactor clarifier 92, and return conduit 112 providing return silica seed slurry to brine inlet conduit 94 for reactor clarifier 98. It is presently preferred, through valves 114 and 116, to return all or most of the silica seed slurry through conduit 110 to the upstream reactor clarifier 92, but alternatively all or most of the return silica seed slurry may be provided to the downstream reactor clarifier 98, or the return silica seed slurry may be divided as desired between the two reactor clarifiers 92 and 98.

Reactor clarifiers 92 and 98 serve three distinct purposes in connection with flash crystallizers 30 and 30a. First, they cause further silica precipitation in suspended, particulate form in the brine so as to lower the dissolved silica content from supersaturated to approximately saturated for the temperature of the brine in reactor clarifiers 92 and 98, or may even lower the silica content to slightly below saturation at the brine temperatures within reactor clarifiers 92 and 98. Second, reactor clarifiers 92 and 98 "clarify" the brine by removing substantially all of the precipated, particulate silica from the primary spent brine flow stream, except for some hazardous classified scale particles which may have broken loose from upstream vessels, conduits and/or valves, and possibly from surfaces within reactor clarifiers 92 and 98. Also, there may be a very minor quantity of extremely fine silica particles not removed from the primary brine stream by reactor clarifiers 92 and/or 98 which would not be in any way harmful to the reinjection well(s). Third, reactor clarifiers 92 and 98 provide a source of silica seed particles which are recirculated to high pressure flash crystallizer 30 so as to be in the main flow stream from high pressure crystallizer 30 to low pressure crystallizer 30a, such seed particles providing assurance that substantially all of the silica which does precipitate in each of the two flash crystallizers and their respective external draft tubes will precipitate in suspended, particulate form rather than as hard, glaze-like scale on surfaces within the two flash crystallizers and associated conduits and valves.

Silica sludge is discharged from the bottom of reactor clarifiers 92 and 98 through respective gravity discharge ports 118 and 120 into respective discharge conduits 122 and 124, at flow rates controlled by respective control valves 126 and 128. Each of the silica sludge discharge conduits 122 and 124 divides into a pair of conduits, a primary sludge processing conduit and a scale separator conduit. Thus, sludge discharge conduit 122 from upstream reactor clarifier 92 divides into a primary sludge processing conduit 130 (directed to the left in FIG. 1A) and a scale separator conduit 132 (directed to the right in FIG. 1A). Similarly, sludge discharge conduit 124 from downstream reactor clarifier 98 divides into a primary sludge processing conduit 134 (directed to the left in FIG. 1A) and a scale separator conduit 136 (directed to the right in FIG. 1A).

The two primary sludge processing conduits 130 and 134 connect into a main sludge processing conduit 138. The reactor clarifier discharge control valves 126 and 128 control the discharge flow of silica sludge so that it is sufficiently slow to enable particulate silica to accumulate in the bottom of reactor clarifiers 92 and 98, and most of this sludge is then conducted through main sludge processing conduit 138 to a sludge thickener generally designated 140, which may be a centrifuge or the like, wherein the sludge is thickened. This primary body of silica discharge sludge is then pumped through a conduit 142 to a filter press 144 or other de-watering device, with the resulting silica solids being discharged at a port 146.

Scale separator conduits 132 and 136 have respective control valves 148 and 150 therein, and downstream of these valves they join into a single silica seed/scale feed conduit 152 which leaves the right-hand side of FIG. 1A at A to be fed to the scale separator of FIG. 1B.

The silica sludge feedback circuit for seeding the precipitation of silica in flash crystallizers 30 and 30a includes a sludge feedback conduit 154 which connects with the main sludge processing conduit 138 to receive a very small fraction of the silica sludge from main sludge processing conduit 138. Sludge feedback injection pressure is provided by means of a pump in conduit 154, and feedback conduit 154 communicates with the high pressure crystallizer recirculation circuit through injector pipe 24, with a valve controlling the rate of flow of the seeding sludge into high pressure draft tube 26, and hence into the high pressure crystallizer recirculation path. Agitation of the brine by the primary flashing in draft tube 26 provides rapid dispersion of the silica seeds through the recirculating brine stream. The silica seeds in the brine flow from high pressure crystallizer 30 to low pressure crystallizer 30a are substantially uniformly dispersed in this flowing brine.

Although such seeding for low pressure flash crystallizer 30a will normally be adequate, if it is desired to provide additional seeding for low pressure flash crystallizer 30a because of the much greater amount of silica precipitation that must be accommodated therein, then a separate sludge injection conduit (not shown) may take off from sludge feedback conduit 154 and communicate with low pressure injector pipe 24a through a suitable control valve (not shown).

The sludge output from the bottoms of reactor clarifiers 92 and 98 through respective gravity discharge ports 118 and 120 and respective discharge conduits 122 and 124 is commonly referred to in the art as "clarifier underflow." During continuous operation of the plant, for high operation efficiency it is essential that a much larger proportion of the clarifier underflow be continuously processed through sludge thickener 140 and filter press 144 of FIG. 1A for ultimate disposal than the proportion of the clarifier underflow sent to the scale separator of FIG. 1B and then returned to the clarifier brine input(s) with the scale removed for re-clarification. Suitable experimentation has determined that a preferred proportion of the clarifier underflow to be continuously sent to the scale separator and then returned to the clarifier input(s) is on the order of about 18-20 percent of the total clarifier underflow volume, this being regulated by suitable adjustment of valves 148 and 150 in the respective underflow scale separator conduits 132 and 136.

The Scale Separator Shown in FIG. 1B

Figure 2:
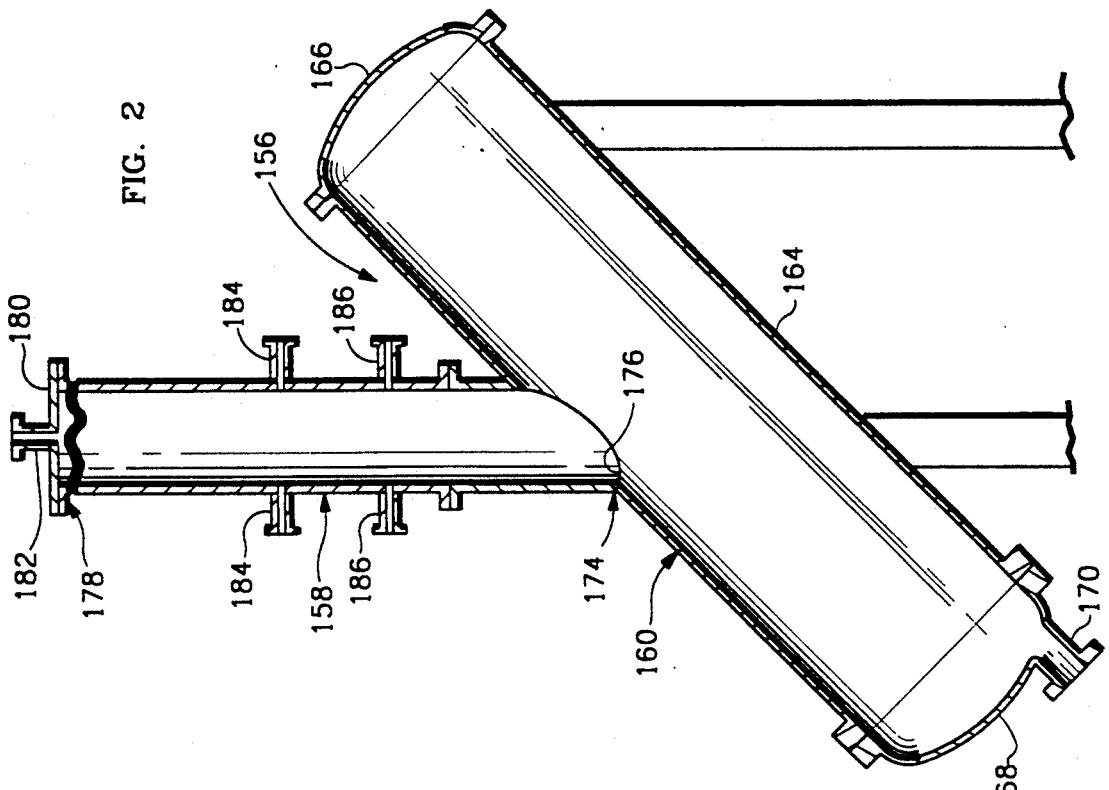
FIG. 2 is an enlarged, fragmentary vertical section taken through the decanter and collector vessel components of the scale separator.

Referring now to FIGS. 1B and 2, the scale separator is generally designated 156, and comprises two principal components, an upper decanter component 158 within which the actual separation of the scale particles from the silica seed particles is effected, and a lower collector vessel component 160 within which the scale particles are collected, and from the bottom of which the scale particles are removed for disposal. Decanter 158 is an elongated cylinder which is preferably substantially vertically oriented for optimum countercurrent separation of the scale particles from the silica seed particles, as described hereinafter in detail.

Collector vessel 160 is also preferably an elongated cylinder, mounted on suitable support structure 162, which is preferably substantially larger in diameter than decanter 158, and which has its cylindrical axis oriented on an incline that is greater than the angle of repose of the scale particles which settle in the cylindrical bottom portion of collector vessel 160. Experimentation indicates that a preferred angle of inclination of the cylindrical axis of collector vessel 160 from the horizontal is on the order of about 40°-45°, which is well above the angle of repose for the separated scale particles received within collector vessel 160. This assures that all of the collected scale particles slide to the bottom of collector vessel 160 for disposal. The relatively large diameter of collector vessel 160 provides a relatively large surface area in its cylindrical bottom portion for receiving the settling scale particles. The cylindrical configuration of collector vessel 160 encourages the scale particles to slide arcuately downwardly toward the cylindrical bottom of collector vessel 160 as the particles slide axially downwardly toward the bottom axial end of collector vessel 160 for removal of scale particle sludge from the lowermost point of collector vessel 160 as described hereinafter. Orientation of the cylindrical axis of collector vessel 160 above the angle of repose for the scale particles assures that substantially all scale particles which fall out of the circulation liquid within collector vessel 160 along its axial length onto the lower cylindrical portion of vessel 160 will slide axially downwardly to this lowermost collection point.

Collector vessel 160 comprises an elongated cylindrical body 164 having externally convexed upper and lower end heads 166 and 168, respectively. A scale dump port 170 extends downwardly from the lower end head 168 proximate the lowermost point in collector vessel 160.

Decanter 158 has an elongated cylindrical body 172, which has a lower end generally designated 174 that is cut off at the same angle of inclination as cylindrical body 164 of collector 160, and arcuately with the same arcuate curvature as cylindrical body 172. There is a sealed connection 176, as by welding, between this inclined, arcuate lower end 174 of decanter body 172 and the upper arcuate wall of collector cylindrical body 164. The upper surface of collector cylindrical body 164 has an oval aperture of the same size and configuration as the open lower end 174 of decanter 158 for full fluid communication between the inside of decanter body lower end 174 and the inside of collector body 164.

The upper end of decanter body 172 is generally designated 178, and is provided with an end cover 180 which has a central outlet port 182 for upward exiting of the separated silica particle slurry from decanter 158.

A pair of diametrically opposed silica seed/scale sludge input ports 184 communicate with the inside of decanter body 172, preferably slightly below the axial center of decanter body 172, and are connected to a respective pair of branch conduits 152a and 152b from silica seed/scale feed conduit 152. Feed conduit 152 enters the left-hand side of FIG. 1B at A, and has a pump 185 therein.

A pair of diametrically opposed dilution liquid input ports 186 communicate with the inside of decanter body 172 below input ports 184, and are connected to respective branch conduits 106a and 106b from the main dilution conduit 106, which has a pump 107 therein. The diammetrical opposition of the respective pairs of input ports 184 and 186 provides balanced inflows from the respective silica seed/scale feed conduit 152 and main dilution conduit 106 which diffuse any tendency for these inflows to cause circulation to be established within decanter 158 that might be adverse to the vertical counterflow separation of the silica seed particles upwardly and scale particles downwardly in decanter 158 which is described hereinafter in detail.

A dump valve generally designated 188 is connected to dump port 170 for periodic blowdown of the scale sludge that collects within the lower end of collector vessel 160. Scale sludge blowdown may be effected either automatically by means of a suitable timer 190, or manually. Timer 190 is selectively connectable to an electrical power source 192 through a switch 194 and conductor 196, valve 188 being electrically operable and electrically connected to timer 190 by a conductor 197. Manual actuation of dump valve 188 may be selectively effected by bypassing automatic timer 190, electrical power source 192 being connectable through switch 194 and conductors 198 and 197 to valve 188. Blowdown scale sludge may be collected in a suitable receiver 200.

It is preferred to actuate dump valve 188 for removal of scale sludge from the lower end of collector vessel 160 relatively frequently, as for example about once every 8-12 hours. However, testing has indicated that periodic actuation of dump valve 188 can be at intervals up to as long as about one week. Alternatively, if desired, dump valve 188 can be adjusted to a continuously open position in which the scale sludge that accumulates at the lower end of collector vessel 160 continuously seeps out through dump port 170 through valve 188 into scale receiver 200.

To provide a dimensional perspective of the scale separator of the present invention, a prototype has embodied a decanter 158 about nine feet long on its centerline and about 20 inches OD, and a collector vessel 160 about 11¼ feet long on its centerline and about 36 inches OD. These dimensions are given by way of example only, and not of limitation.

Separation of Scale Particles from Silica Seed Particles within Decanter 158

For conciseness of definition, applicant prefers to refer to the silica seed/scale particle separation within the vertical decanter 158 as continuous countercurrent decantation. The term "decantation" here is designated to mean upward drawing-off of separated silica particle slurry from downward settling scale sludge without substantial disturbing of the accumulating scale sediment within the lower end of the collector vessel.

This continuous countercurrent decantation process requires continuous liquid upflow through decanter 158. This liquid upflow is caused by the combined liquid inputs to decanter 158 from the silica seed/scale sludge feed conduit 152 through its branch conduits 152a and 152b and respective decanter input ports 184, and from main dilution conduit 106 through its branch conduits 106a and 106b and respective input ports 186 into decanter 158; while the outlet for these combined liquid inputs is the separated seed slurry outlet port 182 and its return conduit 108 exit from the upper end 178 of decanter 158.

Separation of the scale particles from the silica seed particles depends upon three conditions that must be established within decanter 158: (1) that the scale particles be larger and/or higher in density than the silica seed particles; (2) that the upflow velocity of the combined liquids in decanter 158 be greater than the terminal settling velocity of the silica seed particles, and less than the terminal settling velocity of the scale particles; (3) that the viscosity of the mixture of the feeds of silica seed/scale sludge and dilution liquid into the decanter be sufficiently low to enable free gravitational settling of the scale particles downwardly through decanter 158 and collector vessel 160 to the bottom end of collector vessel 160.

Regarding the first condition, tests indicate that the silica seed particles tend to have an average diameter on the order of about 8-12 microns, while the scale particles tend to have an average diameter on the order of about 50 microns or larger; and that the scale particles, which are basically metallic chemical combinations, tend to have an average density greater than the average density of the silica scale particles.

Regarding the terminal settling velocity of the second condition, if an upward flow of liquid is induced against a particle with a velocity equal to the terminal settling velocity of the particle, then the particle would be suspended in a vertically static location; if the upward flow of liquid induced against the particle is greater than the terminal settling velocity of the particle, then the particle would move upwardly at a rate corresponding to the difference between the upward liquid flow velocity and the downward particle settling velocity; while conversely, if the upward liquid flow velocity were less than the particle terminal settling velocity, then the particle would settle at a rate corresponding to the difference between its terminal settling velocity and the upward liquid flow velocity. In general, the larger a particle is, assuming substantially the same shape and density, the larger the ratio between its mass or weight and its surface area and hence the greater its terminal settling velocity; and the higher this ratio is, the higher its settling velocity in a static liquid. Also, assuming substantially the same shape and size, the higher the density of a particle, the higher will be its terminal settling velocity in a static liquid.

Accordingly, the flow rates for the silica seed/scale sludge feed to decanter 158 from conduit 152 and dilution liquid feed to decanter 158 through conduit 106 are adjusted to assure that the cumulative upflow of liquid in decanter 158 has a velocity greater than the terminal settling velocity of the silica seed particles, but less than the terminal settling velocity of the scale particles, allowing the scale particles to settle downwardly through decanter 158 into collector vessel 160, while the silica seed particles flow upwardly through decanter 158 and out through the silica seed slurry return conduit 108 from the top of decanter 158. By way of example only, and not of limitation, testing has indicated that a satisfactory upward liquid flow velocity in decanter 158 is in the range of from about 0.22 feet per second to about 0.28 feet per second, providing good discrete upward flow of silica seed particles and downward flow of scale particles.

The rate of liquid upflow in decanter 158 is established between these upper and lower velocity limits determined by the settling velocities of the particles by adjustment of the valves and/or pumps associated with conduits 152 and 106. Control of the flow through sludge feed conduit 152 is established by adjustment of valves 148 and 150 in respective conduits 132 and 136 (shown in FIG. 1A), and pump 185 (shown in FIG. 1B); while control of the flow through main dilution conduit 106 is controlled by adjustment of fresh water valve 76 in conduit 72, brine valve 84 in atmospheric flash tank conduit 82 (shown in FIG. 1A), and pump 107 in main dilution conduit 106 (shown in FIG. 1B).

Regarding the third operating condition referred to above, the slurry which flows upwardly through decanter 158 has a thixotropic characteristic such that if the particle concentration therein is too great, it tends to become gel-like or molasses-like so as to interfere with the free fallout of scale particles required for proper operation. This thixotropic characteristic is a reversible reaction which is controlled by adding a proper amount amount of dilution liquid through main dilution conduit 106. Experimentation indicates that if a sufficient amount of dilution liquid introduced through dilution conduit 106 relative to the amount of silica seed/scale sludge introduced through feed conduit 152 to hold the solids content within decanter 158 to not more than about 20 percent by weight, then satisfactory separation of the scale particles from the silica seed particles will occur within decanter 158. If the solids content of the liquid within decanter 158 is much more than about 20 percent, it has been found that the settling velocity of the scale particles tends to be too slow for efficient operation of the scale separator. Conversely, if the solids content of the liquid within decanter 158 is much below about 20 percent by weight, then the efficiency of the scale separator drops undesirably because too little clarifier underflow is being processed. The relatively low viscosity achieved by dilution with decanter 158 to about 20 percent by weight solids also enables the circulation liquid within the entire scale separator 156 to effectively keep the silica seed particles washed out of the scale collector vessel 160 for their free upward circulation through decanter 158.

While the present invention has been described with reference to presently preferred embodiments, it is to be understood that various modifications or alterations may be made by those skilled in the art without departing from the scope and spirit of the invention as set forth in the appended claims.

What is claimed is:

1. In a geothermal electrical power generating plant of the type employing flash crystallizer means and reactor clarifier means for processing a large quantity of particulate silica that precipitates out of a geothermal brine stream as thermal energy is extracted from it during power production, a method of separating scale particles which have broken loose into the brine stream from the silica particles, which comprises:

generally continuously diverting a portion of the sludge underflow output of said clarifier means into decanter means, said underflow having particulate solids suspended therein consisting primarily of silica seed particles and also including scale particles;

establishing a liquid slurry medium within said decanter means that includes said underflow portion and which has a sufficiently low viscosity to enable generally free settling movement of said silica and scale particles suspended in said liquid slurry medium; and establishing a continuous upward flow of said liquid slurry medium in said decanter means having an upward velocity that is substantially greater than the terminal settling velocity of said silica particles but substantially less than the terminal settling velocity of said scale particles, whereby most of said silica particles will rise upwardly in said decanter means to an upper silica slurry removal location, and most of said scale particles will settle downwardly in said decanter means to a lower scale collection location.

2. A method according to claim 1, which comprises returning said silica slurry from said silica slurry removal location to the input of said clarifier means for reprocessing in said clarifier means.

3. A method according to claim 2, wherein said decanter means comprises elongated tube means having its tubular axis generally vertically oriented.

4. A method according to claim 3, which comprises controlling the viscosity of said liquid slurry medium in said decanter means to said sufficiently low viscosity by generally continuously adding dilution liquid into said decanter means in addition to said underflow.

5. A method according to claim 4, wherein a sufficient amount of said dilution liquid is added to reverse the generally thixotropic nature of said underflow.

6. A method according to claim 4, which comprises generally continuously adding a sufficient amount of said dilution liquid so that said slurry medium contains not more than about 20 percent by weight solids.

7. A method according to claim 4, wherein said dilution liquid is derived from at least one liquid source in the plant selected from the group of liquid sources consisting of injection brine outflow from said clarifier means, brine flow through atmospheric flash tank means located immediately upstream of said clarifier means, and fresh water outflow from condensor hotwell means.

8. A method according to claim 3, which comprises controlling the upward flow velocity of said slurry medium in said decanter tube means to a range of from about 0.22 to about 0.28 feet per second.

9. A method according to claim 2, wherein said diverted portion of said underflow is in the range of about 18-20 percent of the total underflow volume, the rest of said underflow being processed for disposal.

10. A method according to claim 3, which comprises defining said lower scale collection location within scale collector vessel means operatively connected to the lower end portion of said decanter tube means for fluid communication with said decanter tube means.

11. A method according to claim 10, which comprises providing said collector vessel means in the form of an elongated, generally cylindrical tank having closed ends, and orienting the cylindrical axis of said tank at an angle relative to the horizontal that is greater than the angle of repose of the scale particles which settle in said tank, whereby said settled scale particles will slide generally axially downwardly in said tank to a removal location proximate the lower end of said tank.

12. A method according to claim 11, which comprises orienting the cylindrical axis of said tank at least about 40° relative to the horizontal.

13. A method according to claim 11, which comprises orienting the cylindrical axis of said tank about 40°-45° relative to the horizontal.

14. A method according to claim 11, which comprises periodically removing accumulated scale particles from said scale removal location.

15. A method according to claim 11, which comprises substantially continuously removing accumulated scale particles from said scale removal location.

16. In a geothermal electrical power generating plant of the type employing flash crystallizer means and reactor clarifier means for processing a large quantity of particulate silica that precipitates out of a geothermal brine stream as thermal energy is extracted from it during power production, apparatus for separating scale particles which have broken loose into the brine stream from the silica particles, which comprises:
 elongated tubular decanter means having its tubular axis generally vertically oriented, and having upper and lower end portions;
 substantially closed scale collector vessel means located generally below said decanter means and operatively connected to said lower end portion of said decanter means for fluid communication with said decanter means, said collector vessel means having a scale collection location in the bottom thereof;
 first fluid conduit means from underflow means of said clarifier means to said decanter means for generally continuously diverting a portion of the underflow from said underflow means, said underflow portion having particulate solids suspended therein consisting primarily of silica seed particles and also including scale particles;
 a source of dilution liquid in said plant, and second fluid conduit means from such source to said decanter means for generally continuously diluting said underflow portion to provide a liquid slurry medium in said decanter means which has a sufficiently low viscosity to enable generally free settling movement of said silica and scale particles; and
 slurry removal port means in said upper end portion of said decanter means for generally continuous removal of said liquid slurry medium from said decanter means, which establishes a continuous upward flow of said liquid slurry medium in said decanter means that has an upward velocity that is substantially greater than the terminal settling velocity of said silica particles but substantially less than the terminal settling velocity of said scale particles, whereby most of said silica particles will rise upwardly in said decanter means and out through said slurry removal port means, and most of said scale particles will settle downwardly in said decanter means into said scale collector vessel means and downwardly therein to said scale collection location.

17. Apparatus according to claim 16, which comprises return conduit means from said slurry removal port means to the input of said clarifier means for reprocessing of said liquid slurry medium in said clarifier means.

18. Apparatus according to claim 17, which comprises flow control means in said second fluid conduit means for providing a sufficient amount of said dilution liquid to said decanter means to reverse the generally thixotropic nature of said underflow.

19. Apparatus according to claim 17, which comprises flow control means in said second fluid conduit means for providing a sufficient amount of said dilution liquid to said decanter means so that said slurry medium contains not more than about 20 percent by weight solids.

20. Apparatus according to claim 17, wherein said dilution liquid source comprises at least one liquid source from the group consisting of injection brine outflow conduit means from said clarifier means, atmospheric flash tank means located immediately upstream of said clarifier means, and condensor hotwell means.

21. Apparatus according to claim 17, which comprises flow control means associated with said return conduit means for controlling the upward flow velocity of said slurry medium in said decanter means to a range of from about 0.22 to about 0.28 feet per second.

22. Apparatus according to claim 17, which comprises flow control means in said first conduit means for diverting about 18-20 percent of the total clarifier underflow volume to said decanter means.

23. Apparatus according to claim 17, wherein said scale collector vessel means comprises an elongated, generally cylindrical tank having closed ends, and said operative connection between said decanter means and said scale collector vessel means is located at a generally upwardly facing region along the length of the cylindrical part of said tank; the cylindrical axis of said tank being oriented at an angle relative to the horizontal that is greater than the angle of repose of the scale particles which settle in said tank, whereby said settled particles will slide generally axially downwardly in said tank to a scale removal location proximate the lower end of said tank.

24. Apparatus according to claim 23, wherein the cylindrical axis of said tank is oriented at least about 40° relative to the horizontal.

25. Apparatus according to claim 23, wherein the cylindrical axis of said tank is oriented about 40°-45° relative to the horizontal.

26. Apparatus according to claim 23, which comprises means connected with said tank proximate its said scale collection location for periodically removing accumulated scale particles from said tank.

27. Apparatus according to claim 23, which comprises means connected with said tank proximate its said scale collection location for substantially continuously removing scale particles from said tank.

* * * * *